(12) United States Patent
Riggs

(10) Patent No.: US 9,408,351 B2
(45) Date of Patent: Aug. 9, 2016

(54) CENTER PIVOT IRRIGATOR WATER PURGING ASSEMBLY

(71) Applicant: Cameron Riggs, Iuka, KS (US)

(72) Inventor: Cameron Riggs, Iuka, KS (US)

( * ) Notice: Subject to any disclaimer, the term of this patent is extended or adjusted under 35 U.S.C. 154(b) by 0 days.

(21) Appl. No.: 14/885,124

(22) Filed: Oct. 16, 2015

(65) Prior Publication Data

US 2016/0025254 A1    Jan. 28, 2016

(51) Int. Cl.
*B05B 15/02* (2006.01)
*A01G 25/09* (2006.01)
*B05B 15/00* (2006.01)

(52) U.S. Cl.
CPC .............. *A01G 25/09* (2013.01); *A01G 25/092* (2013.01); *B05B 15/00* (2013.01)

(58) Field of Classification Search
CPC .... A01G 25/09; A01G 25/092; B05B 515/00; B05B 515/02; B05B 515/0208
USPC ......... 239/104, 106, 110, 111, 112, 113, 728, 239/734
See application file for complete search history.

(56) References Cited

U.S. PATENT DOCUMENTS

| | | | | |
|---|---|---|---|---|
| 3,603,508 A | * | 9/1971 | Ingram ................... | A01G 25/09 239/111 |
| 4,031,915 A | * | 6/1977 | McElhoe ................ | A01G 25/06 137/529 |
| 4,156,504 A | * | 5/1979 | Hegemann ........... | A01G 25/092 239/110 |
| 5,435,495 A | * | 7/1995 | Davis .................... | A01G 25/092 239/726 |
| 9,066,476 B2 | * | 6/2015 | Christiansen ........ | A01G 25/092 |

* cited by examiner

*Primary Examiner* — Christopher Kim
(74) *Attorney, Agent, or Firm* — Kenneth H. Jack; Davis & Jack, L.L.C.

(57) ABSTRACT

A center pivot irrigator water purging assembly incorporating an overhead pipe supporting a multiplicity of sprinkler drop tubes and a purge pipe; and further incorporating an adaptor pipe communicating with the purge pipe; an "E" bracket fixedly attached to the adaptor pipe; a diaphragm actuator fixedly attached to the "E" bracket; a disc and valve stem attached to the diaphragm actuator for movements between first and second positions, the disc seating against the adaptor pipe in the first position and displacing from the first position in the second position; and a diaphragm actuating shunt having an input end attached in communication with the lower end of one of the irrigator's sprinkler drop tubes.

13 Claims, 4 Drawing Sheets

CENTER PIVOT IRRIGATOR WATER PURGING ASSEMBLY

FIELD OF THE INVENTION

This invention relates to center pivot irrigation systems. More particularly, this invention relates to apparatus attachable as a component of such systems for purging water and accumulated sand and debris from radially outer ends of such system's overhead pipes.

BACKGROUND OF THE INVENTION

Well pumps which supply water to center pivot irrigation systems commonly draw water from sand bearing strata. As a result, such pumps commonly and undesirably drive sandy water through the irrigator's circularly traveling overhead pipe. The water is conveyed radially outwardly through the system's overhead pipe for emission through the overhead pipe's down tube sprinkler outlets, and as the water passes radially outwardly, the system becomes less and less able to effectively purge or discharge the sand. Accordingly, center pivot irrigating systems are least capable of discharging or purging sand at their extreme radially outer ends, resulting in undesirable accumulations of sand.

Such sand accumulations interfere with the function of an irrigation system and to maintain irrigation, water and sand purging valves are known to be installed at an irrigation system's radially outer end. Such purge valves are commonly mechanically complex, and typically undesirably drive a valve seating element or disc in a downstream or water purging direction against a downstream valve seat. Such valve seating action undesirably promotes accumulations of sand at and about the valve's seat and seal components. Such irrigation system purge valves also commonly incorporate a valve housing or body which further undesirably contributes to sand accumulation and valve fouling.

The instant inventive center pivot irrigator water purging assembly solves or ameliorates the problems discussed above by providing a specially configured actuator, support bracket and shunt line assembly which prevents accommodations of sand at and about the valve's body and which automatically purges water from the valve's actuator.

BRIEF SUMMARY OF THE INVENTION

The instant inventive center pivot irrigator water purging assembly is intended for attachment to and operation at a radially outer end of a common center pivot irrigation system. Such system commonly comprises a source of irrigating water, such as a well or water main located at or near a field which is to be irrigated. The irrigation water is carried via a pipe from such water source to a pivot tower which is centrally located within the field to be irrigated. A linear series of rolling "A" frame towers and inter-linking overhead pipe segments extends radially outwardly from the central tower, and the irrigation water is further pumped upwardly through the tower, and thence distributed radially outwardly for emission at a multiple series of sprinkler drop tubes which are mounted to the overhead pipes.

A first structural component of the instant inventive assembly comprises a purge pipe which communicates with the irrigator's overhead pipe. To maximize the inventive assembly's sand purging capability, the purge pipe is preferably attached at the overhead pipe's extreme radially outer end, the purge pipe preferably extending downwardly.

A further structural component of the instant inventive assembly comprises an adaptor pipe having an input end attached in communication with the purge pipe's output end. In the preferred embodiment, such communication comprises a 90° elbow joint which holds and extends the adaptor pipe in alignment with a substantially horizontal longitudinal axis.

A further structural component of the instant inventive assembly comprises a rigid frame which is fixedly attached to the adaptor pipe. In a preferred embodiment, the rigid frame is "E" configured having a column portion and a plurality of distally and oppositely longitudinally extending arms. The rigid frame component which functions as a valve body and preferably defines a substantially open valve seating and sealing space.

A further structural component of the instant inventive apparatus comprises a diaphragm actuator of the type capable of inflating and deflating for reciprocatingly moving a valve stem and valve member combination in the longitudinal and oppositely longitudinal directions. The valve member preferably comprises an elastomeric disc which is connected operatively to the oppositely longitudinal end of the valve stem.

In the preferred embodiment, the rigid frame is configured so that it positions the diaphragm actuator down stream and longitudinally from the adapter pipe's water output end. Upon such longitudinally downstream positioning, the actuator may advantageously move the disc between first and second positions, the disc seating oppositely longitudinally against and closing the adaptor pipe's output end while in the first position. Oppositely longitudinal movement of the disc toward the second position is preferably in a downstream direction, such movement displacing the disc away from the first position and opening the adaptor pipe for water and sand purging through the open valve body.

A further structural component of the instant inventive assembly comprises a tube configured diaphragm actuating signal line or shunt line which diverts water flow and pressure supplied by the overhead pipe to the diaphragm actuator. In suitable embodiments, an input end of the shunt is attached in communication with a pipe selected from the group consisting of one of the sprinkler drop tubes, the overhead pipe, the purge pipe, and the adaptor pipe. In a most preferred embodiment, such attachment draws valve actuating water pressure from a radially outermost sprinkler drop tube.

In operation of the instant inventive assembly, water flow and pressure within the overhead pipe is directed via the purge pipe and to the adaptor pipe, the water preferably simultaneously flowing through the shunt tube to a longitudinally positioned hermetic chamber within the diaphragm actuator, such flow filling such chamber with air and/or water.

Pressurized filling of the air and/or water within the diaphragm actuator's hermetic chamber deflects the actuator's flexible diaphragm oppositely longitudinally and drives the valve stem and the disc in the upstream direction. Such water actuated driving of the disc securely seats and seals the disc against the adaptor pipe's longitudinal output end which functions as a valve seat.

Such diaphragm actuator driven valve seating normally closes the valve while water irrigation occurs. During such valve closure, sand intermixed within the irrigating water normally collects and falls downwardly through the purge pipe, and accumulates within the adaptor pipe. Cessation of flow and pressure within the overhead pipe reduces pressure within the shunt line and allows the elastic nature of the actuator's diaphragm to withdraw the disc in the longitudinal downstream direction. Upon such withdrawal, the valve opens, and water and accumulated sand advantageously purges outwardly and downwardly through the open spaces of the rigid frame. Provided that the input end of the shunt line attaches to one of the sprinkler drop tubes at an elevation lower than the diaphragm actuator, purging of the sprinkler drop tube advantageously automatically purges water and any sand from the shunt tube and from the diaphragm actuator's expansion space.

Accordingly, objects of the instant invention include the provision of a center pivot irrigator water purging assembly which incorporates structures as described above, and which arranges those structures in relation to each other in manners described above for the performance of the functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
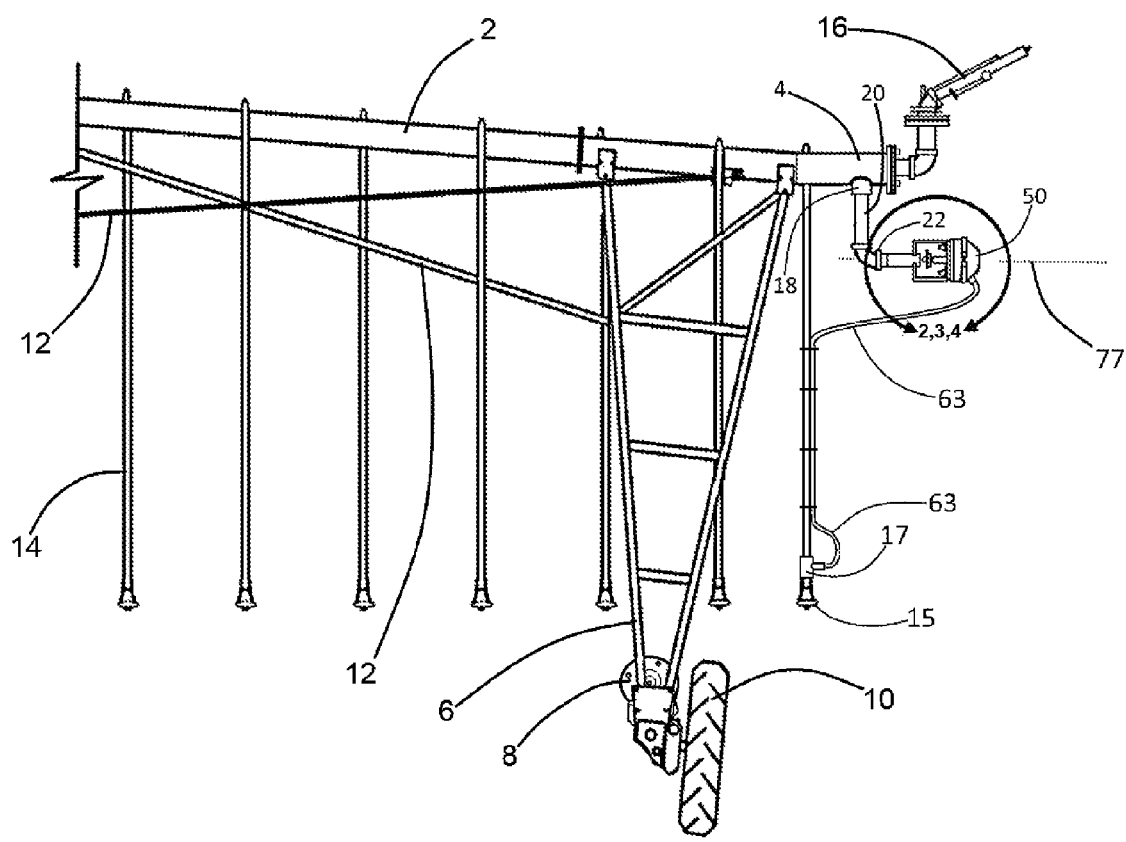
FIG. 1 is a side view of the instant inventive center pivot irrigator water purging assembly, the view showing a radially outer end of a center pivot irrigator to which such assembly is attached.

Referring now to the drawings, and in particular to Drawing FIG. 1, the extreme radially outer end of a common center pivot irrigation system is depicted, such system having an overhead water carrying pipe 2, and at least a first "A" frame tower 6. The "A" frame tower 6 typically is one of a plurality of such towers which are evenly spaced between the overhead pipe's extreme radially outer end 4 and a center pivot tower (not depicted within views). Each such "A" frame tower 6 has a pair of tangentially spaced wheels 10, and incorporates electric motor means 8 for rotating the wheels 10 and for circularly moving the tower 6 and pipe 2 over crops to be watered. Truss braces 12 lend horizontal stiffness to the overhead pipe 2, and a series of sprinkler drop tubes 14 having low end nozzles 15 communicate with the overhead pipe 2 for emitting the irrigating water along the radial length of the overhead pipe 2. The extreme radially outer end 4 of the overhead pipe 2 is commonly equipped with a directional spray gun 16 which effectively extends the watering capability of the irrigator beyond the radial length of the overhead pipe 2.

Figure 2:
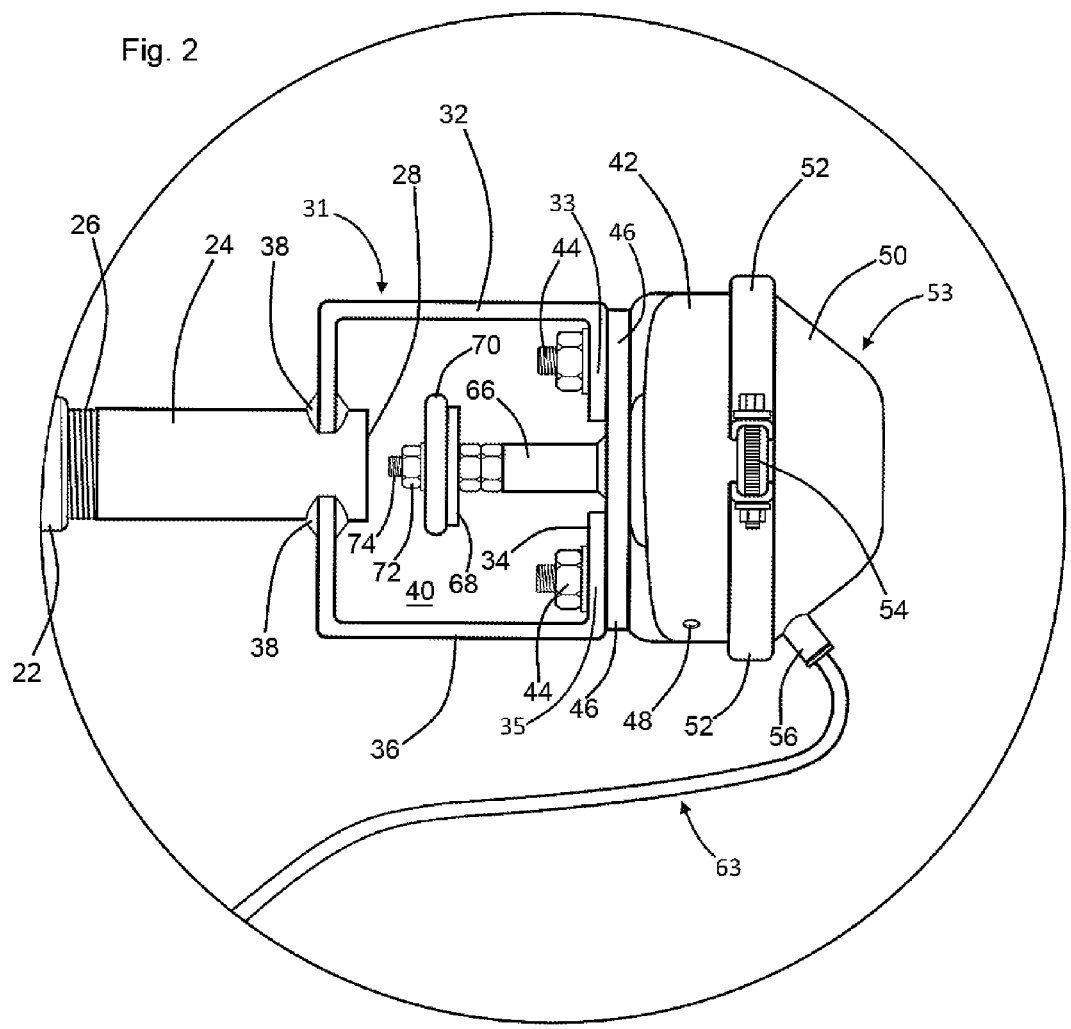
FIG. 2 is a magnified view of a portion of the structure of FIG. 1.

Referring simultaneously to FIGS. 1 and 2, the extreme radially outer end 4 of the overhead pipe 2 preferably has a sleeve configured output port 18, such port preferably being downwardly positioned for efficient purging of water and outwashing of accumulated sand. A purge pipe 20 preferably communicates via screw connection with and extends downwardly from the purge port 18. A horizontally and longitudinally extending adaptor pipe 24 is fixedly attached to and communicates with the output end of the purge pipe 20. In the preferred embodiment, such communication comprises an elbow joint 22 which holds and extends the adaptor pipe 24 in alignment with a substantially horizontal longitudinal axis 77.

An open rigid frame, referred to generally by Reference Arrow 31, is fixedly attached to the adaptor pipe 24, suitably by means of welds 38, and a diaphragm actuator 53 is fixedly attached to the longitudinal end of the rigid frame 31, suitably by means of a "T" plate 46 and by nut and bolt combinations 44.

Figure 3:
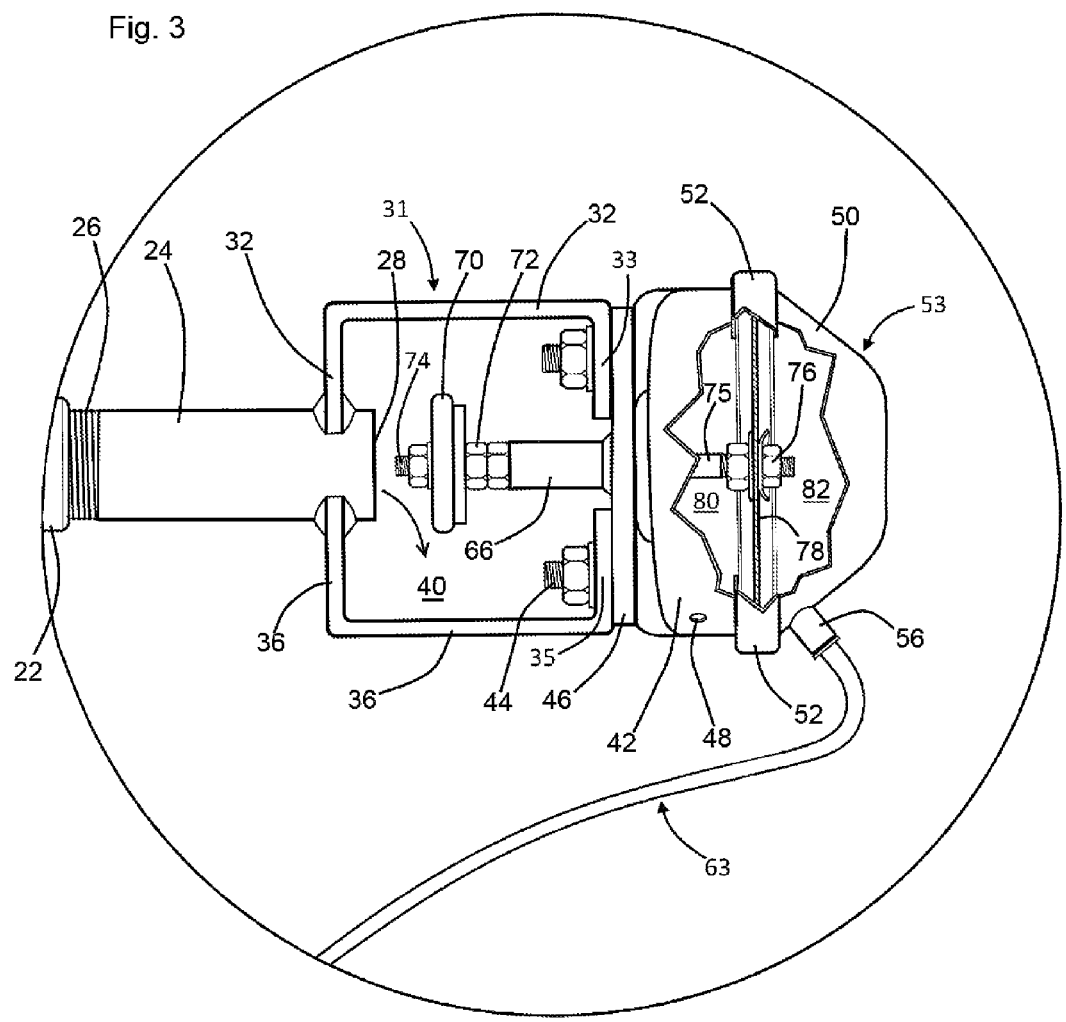
FIG. 3 redepicts the structure of FIG. 2, the view of FIG. 3 including wall structure cut-aways for explanation of underlying structures.

Referring to FIG. 3, a disc 70, preferably composed of a durable elastomeric material, is operatively connected by a valve stem 75 oppositely longitudinally from the diaphragm actuator 53. In a preferred embodiment, the disc 70 is mounted to the valve stem 75 by mounting nuts 72 which engage a helically threaded stem end 74. For purposes of secure valve member seating, a rigid disc configured backing plate 68 is preferably disposed between nuts 72 and disc 70.

Figure 4:
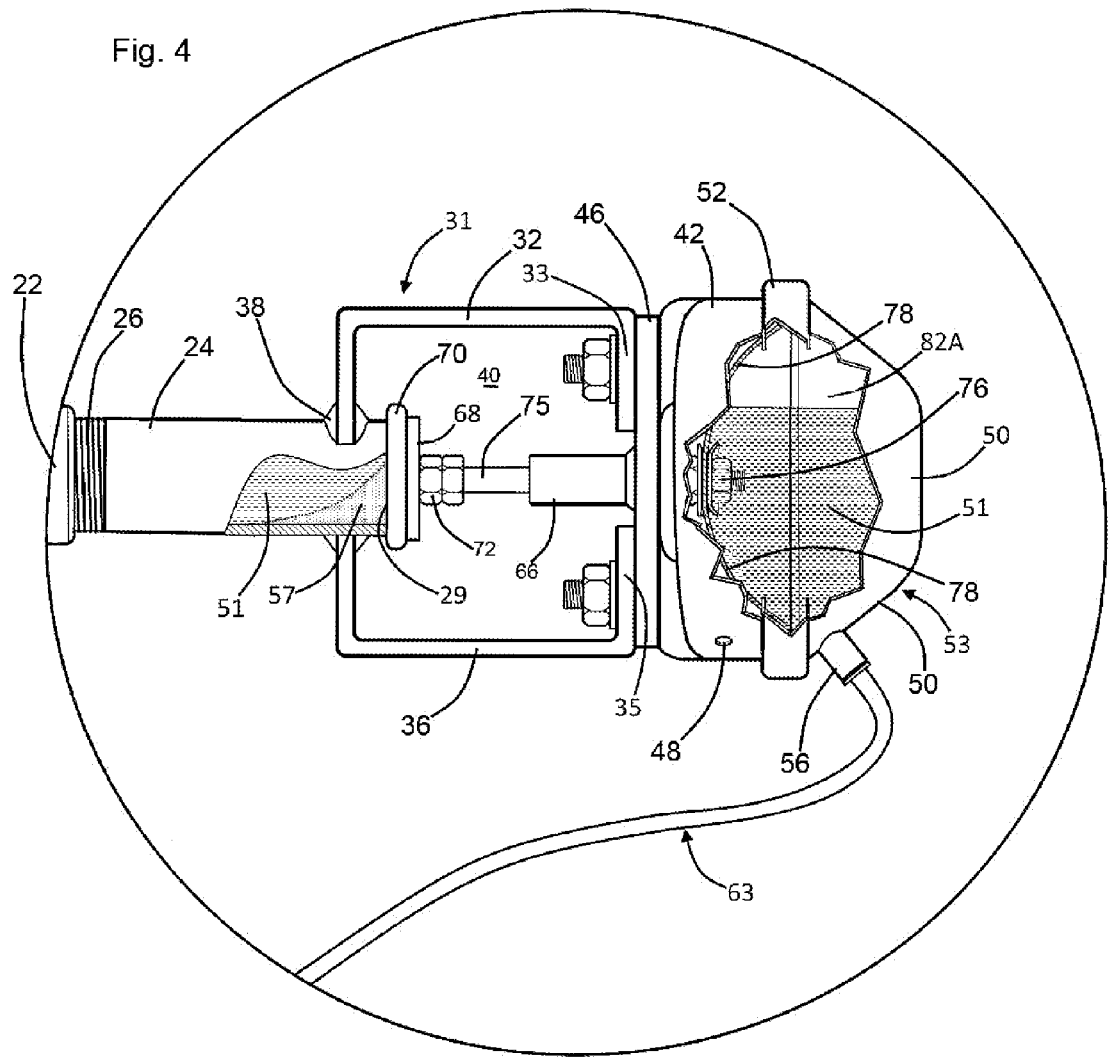
FIG. 4 redepicts the structure of FIGS. 2 and 3, the view of FIG. 4 including alternative structural positioning, and alternative structural wall cut-aways.

Referring simultaneously to FIGS. 3 and 4, the rigid frame 31 is preferably positioned and configured for holding the diaphragm actuator 53 at the depicted downstream or longitudinal orientation, such orientation allowing the actuator to drive and guide movements of the valve stem 75 and the disc 70 between first and second positions. The first disc position is depicted in FIG. 4, and at such position, disc 70 seats and oppositely longitudinally seals against the annular lip 28 at the longitudinal output end of the adaptor pipe 24. Accordingly, such lip 28 functions in relation to the disc 70 as a valve seat. Compressive contact between the valve seat 28 and the disc 70 may advantageously form a hermetic water seal 29. Alternatively, upon an opposite downstream or longitudinally directed motion of the disc 70 toward its second position, such disc becomes displaced away from the first position, effectively opening the adaptor pipe 24 for discharge of water 51 and sand 57.

Referring simultaneously to FIGS. 1, 3 and 4, the instant inventive assembly preferably further comprises a tube configured signal line or shunt which is referred to generally by Reference Arrow 63. The input end of the shunt 63 is necessarily attached in communication with one of the pipes selected from the group consisting of the sprinkler down tubes 14, the overhead pipe 2, the purge pipe 20, and the adaptor pipe 24. However, in the preferred embodiment depicted in FIG. 1, such shunt's input end communicates with a radially outermost sprinkler down tube 14 at a low end "T" joint 17 mounted immediately above a nozzle 15.

The preferred low elevation of the input end of the shunt 63 with respect to the diaphragm actuator 53 advantageously automatically drains the shunt 63 and of the diaphragm actuator 53 upon cessation of crop irrigating water pressure and flow.

The diaphragm actuator 53 preferably comprises a clam shell configured case having a hermetically sealed longitudinal half 50 situated at the assembly's downstream end. A durable elastic diaphragm member 78 spans across and closes the clam shell half 50, such diaphragm 78 being securely clamped and held in place by an external screw actuated "O" clamp 52,54.

As the shunt 63 diverts water 51 from the overhead pipe 2 into and through a downwardly positioned port 56, space 82 fills and oppositely longitudinally deflects the diaphragm 78 in the upstream direction from the retracted longitudinal position depicted in FIG. 3 to the oppositely longitudinally extended position depicted in FIG. 4. At least a first port 48, and preferably a plurality of such ports, are provided for opening the oppositely longitudinal clam shell case half 42, such ports 48 allowing air to freely flow into and out of space 80 as the water 51 and air 82A fills and drains space 82. The downstream or longitudinal end of the valve stem 75 which meets the diaphragm 78 is preferably securely and hermetically attached by means of a helically threaded nuts and washer combination 76.

The rigid frame 31 is preferably "E" configured to include a plurality of arms which comprises a pair of diaphragm actuator supporting arms 32 and 36, and comprises a longitudinally positioned column portion. Such "E" column preferably comprises mounting flanges 33 and 35 at the proximal ends of arms 32 and 36, and includes the "T" plate 46. Preferably, such "E" frame's plurality of arms further comprises a centrally or medially positioned arm 66 which is configured as a slide sleeve which receives and guides reciprocating motions of the valve stem 75. The hollow bore of such medial "E" arm 66 preferably extends through and opens at the "T" plate 46 component of the "E" frame's column member, and an eye (not depicted within views) preferably aligns with such hollow bore and opens at the oppositely longitudinal wall of the clam shell half 42, such eye receiving the valve stem 75.

Referring simultaneously to all figures, in operation of the instant inventive assembly, portions of the water 51 within the overhead pipe 2 are diverted to fill the diaphragm actuator space 82 via shunt 63. As such pressurized water 51 and air 82A fills space 82, the flexible diaphragm 78 inflates and deflects leftwardly or oppositely longitudinally (according to the views of FIGS. 3 and 4) in the upstream direction, such motion being from the retracted position of FIG. 3 toward the extended position of FIG. 4. Such oppositely longitudinal diaphragm extension slidably drives the valve stem 75 through "E" frame's medial arm sleeve 66, compressively driving the elastomeric disc 70 into seating and sealing contact with the circular lip or valve seat 28 at the longitudinal end of the adaptor pipe 24. Upon such valve seating, portions of the water 51 which reach the adaptor pipe 24 are effectively dammed.

Continued operation of the irrigator while the adaptor pipe 24 remains sealed typically carries portions of sand 57 from the well water 51 toward and across the upper opening of port 18. Such sand 57 falls downwardly through purge pipe 20 and accumulates, as indicated in FIG. 4, at the sealed joint between the downstream lip 28 of purge pipe 24 and the disc 70.

Upon termination of water irrigation and cessation of water pressure and flow within the overhead pipe 2, water and air pressure within space 82 and within shunt 63 drops, allowing the elastic nature of the diaphragm 78 to rebound and to longitudinally retract the valve stem 75. Accordingly, termination of water irrigation automatically unseals the disc 70 and opens the adaptor pipe 24 at lip 28. Such pipe opening allows the portion of the sand 57 residing within the adaptor pipe 24 to spill outwardly and downwardly as indicated by the arrow drawn upon FIG. 3. Such purged sand and water advantageously flows outwardly and conveniently passes downwardly through the "E" frame's open frame spaces 40.

The termination of irrigation water pressure also advantageously allows the sprinkler drop tubes 14 to downwardly purge. Such drop tube purging draws shunt tube water through "T" connector 17, and advantageously automatically purges water and any sand from the shunt line 63 and from the diaphragm valve 53.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. A center pivot irrigator water purging assembly, the center pivot irrigator comprising a radially extending series of rolling towers and an overhead pipe spanning between said towers, the overhead pipe supporting a multiplicity of sprinkler drop tubes and having a radially outer end, said assembly comprising:
    (a) a purge pipe communicating with the overhead pipe's radially outer end, the purge pipe having input and output ends;
    (b) an adaptor pipe having an input end and a longitudinal output end, the adapter pipe's input end communicating with the purge pipe's output end;
    (c) a ridged frame fixedly attached to and extending longitudinally from the adaptor pipe;
    (d) a diaphragm actuator fixedly attached to the ridged frame;
    (e) a disc and valve stem combination connected operatively to the diaphragm actuator, the rigid frame positioning said actuator and combination for movement of the disc between first and second positions, the disc seating oppositely longitudinally against the adaptor pipe's longitudinal output end while in the first position and being displaced longitudinally away from the first position while in the second position; and
    (f) a shunt having input and output ends, the shunt's input end communicating with a pipe selected from the group consisting of the sprinkler drop tubes, the overhead pipe, the purge pipe, and the adaptor pipe, the shunt's output end communicating with the diaphragm actuator.

2. The center pivot irrigator water purging assembly of claim 1 wherein the rigid frame comprises an "E" bracket having a longitudinal column and a plurality of arms fixedly attached to and extending oppositely longitudinally from the longitudinal column.

3. The center pivot irrigator water purging assembly of claim 2 wherein one of the arms among the "E" bracket's plurality of arms comprises a sleeve, said sleeve slidably receiving the valve stem.

4. The center pivot irrigator water purging assembly of claim 3 wherein the actuator is fixedly attached to the "E" bracket's column.

5. The center pivot irrigator water purging assembly of claim 4 wherein the adaptor pipe and the valve stem have longitudinal axes, and wherein said axes extend substantially parallel with each other.

6. The center pivot irrigator water purging assembly of claim 1 wherein the shunt's input end is attached in communication with one of the sprinkler drop tubes.

7. The center pivot irrigator water purging assembly of claim 6 wherein the diaphragm actuator and the shunt's input end have elevations, the shunt's input end elevation being lower than the diaphragm actuator's elevation.

8. The center pivot irrigator water purging assembly of claim 7 wherein the diaphragm actuator comprises a clam shell case having a longitudinal half, the shunt's output end being attached in communication with said longitudinal half.

9. The center pivot irrigator water purging assembly of claim 8 wherein the clam shell's case's longitudinal half has a lower end, and wherein the shunt's output end is attached in further communication with said lower end.

10. The center pivot irrigator water purging assembly of claim 9 wherein the disc comprises a flexible elastomer.

11. The center pivot irrigator water purging assembly of claim 5 wherein the disc comprises a flexible elastomer.

12. The center pivot irrigator water purging assembly of claim 10 further comprising an elbow joint, the adaptor pipe input end's communication with the purge pipe's output end comprising the elbow joint.

13. The center pivot irrigator water purging assembly of claim 11 further comprising an elbow joint, the adaptor pipe input end's communication with the purge pipe's output end comprising the elbow joint.

\* \* \* \* \*